United States Patent [19]

Merchant

[11] Patent Number: 5,922,156
[45] Date of Patent: Jul. 13, 1999

[54] METHOD OF MAKING A BENT INFLATION TUBE

[75] Inventor: William Sydney Merchant, Neston, United Kingdom

[73] Assignee: Dunlop Beaufort Limited, London, United Kingdom

[21] Appl. No.: 08/786,331

[22] Filed: Jan. 23, 1997

[30] Foreign Application Priority Data

Feb. 2, 1996 [GB] United Kingdom .................... 9602167
Mar. 21, 1996 [GB] United Kingdom .................... 9605976

[51] Int. Cl.⁶ ........................... B29C 53/08; B29C 53/36; B63B 7/08; B63B 35/613; B63C 9/02
[52] U.S. Cl. ...................... 156/66; 114/345; 138/DIG. 8; 156/91; 156/198; 156/218; 428/12; 441/40
[58] Field of Search ...................................... 156/218, 203, 156/198, 91, 66; 428/12; 441/40; 114/345; 138/DIG. 8

[56] References Cited

U.S. PATENT DOCUMENTS

| | | |
|---|---|---|
| 3,919,027 | 11/1975 | Jones . |
| 4,472,225 | 9/1984 | Bimpson ............................. 156/218 X |
| 4,678,443 | 7/1987 | Edwards et al. ...................... 441/40 X |
| 5,419,726 | 5/1995 | Switlik et al. . |

FOREIGN PATENT DOCUMENTS

| | | |
|---|---|---|
| 0 042 582 | 12/1981 | European Pat. Off. . |
| 3015619A1 | 10/1981 | Germany . |
| 2006124 | 5/1979 | United Kingdom ..................... 441/40 |
| 2036655 | 7/1980 | United Kingdom . |

*Primary Examiner*—Adrienne C. Johnstone
*Attorney, Agent, or Firm*—Stevens, Davis, Miller & Mosher, L.L.P.

[57] ABSTRACT

A method of making a bent inflatable tube includes providing elements on the boundaries of the tube surfaces which contact one another, such as elements which are interengaging loops through which is passed a tension member, such as a cord, or alternatively using interengaging teeth of a zip fastener or male and female components to hold the tube in a bent condition.

7 Claims, 4 Drawing Sheets

METHOD OF MAKING A BENT INFLATION TUBE

BACKGROUND OF THE INVENTION

1. Field of the Invention

This invention relates to an inflatable tube i.e. a hollow tube of, for example, polymer-coated fabric material, that is suitable for use, for example, as a buoyancy tube for an inflatable liferaft.

2. Description of the Related Art

An inflatable liferaft usually has one or more buoyancy tubes around its perimeter, the tube or tubes supporting the raft and one or more occupants in a floating condition. The or each tube is bent or folded at appropriate positions so in plan, the liferaft is polygonal e.g. hexagonal or octagonal.

In U.S. Pat. No. 4,472,225 to Bimpson there is described a method of making a length of inflatable tube with a bend in it, which includes the steps of overlapping and joining the longitudinal edges of a suitable sheet of material to form a flattened tube, marking on one surface of the flattened tube a fold line corresponding to the desired position of the bend, marking one on each side of the fold line, two areas of the fabric that are to be pressed together to form the bend, folding the flattened tube so that the said two areas contact each other, joining said two areas together and sealing the ends of the tube. The preferred method of joining the said two areas is by a welding technique, although adhesive could be used if desired. The welding is carried out by any conventional method including heat-, high frequency-, or radio frequency-welding techniques.

However it has been found that due to the permanent nature of the joining methods referred to above, unwanted tensions etc are present in the fabric adjacent the bend with the result that a fault sometimes occurs.

It is an object of the present invention to substantially overcome or reduce the effects of this disadvantage.

SUMMARY OF THE INVENTION

In accordance with the invention a method of making a length of inflatable tube with a bend in it, comprising joining the longitudinal edges of a sheet of suitable material to form a tube, marking on one surface of the material before or after the tube has been formed two lines, one on each side of the desired position of the bend, said lines being the boundaries of surface areas which contact each other when the inflated tube is bent, attaching along at least part of the length of each line releasably interconnectable elements, and forming the bend, the elements holding the tube in the bent condition when interconnected.

The elements may be permanently attached to the material surface e.g. by welding or by means of adhesive.

The elements may comprise two series of loops which, when the bend is made, interdigitate with each other and a tension member such as a cord is passed through the loops, and secured to hold the tube in the bent condition.

The elements may alternatively comprise the two parts of a zip fastener, and the row of teeth from one part interdigitate and interconnect with the row of teeth from the other part to hold the tube in the bent condition.

The elements may comprise a male component and a female component e.g. a projecting rib and a correspondingly shaped recessed groove, the male component fitting inside the female component to hold the tube in the bent condition.

Two embodiments of the invention will now be described by way of example only with reference to the accompanying drawings.

DESCRIPTION OF THE PREFERRED EMBODIMENTS

Figure 1:
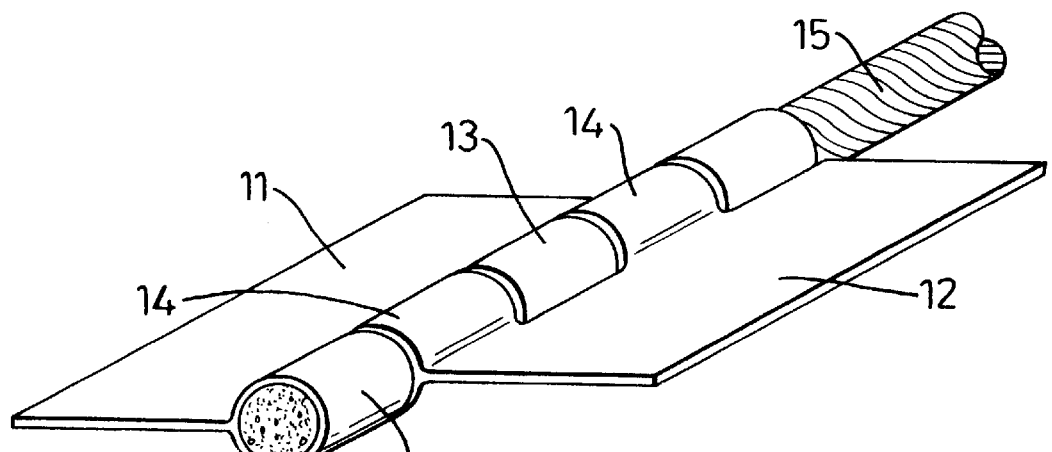
FIG. 1 shows a perspective view of part of two elements and a cord for holding an inflated tube in a bent position according to a first embodiment of the invention.

The two joining elements 11 and 12 shown in FIG. 1 for the manufacture of a bent tube according to the first embodiment each comprise polymer coated sheet fabric folded in half and the two halves joined together e.g. by welding or suitable adhesive, but leaving an elongated area adjacent the fold unjoined. Rectangular areas are then cut from the unjoined material to leave a row of castellated loops 13,14 on each element. When the two elements are brought together the loops interengage as shown in FIG. 1 and a cord 15 may be passed through them to hold the two elements 11 and 12 together.

Figure 2:
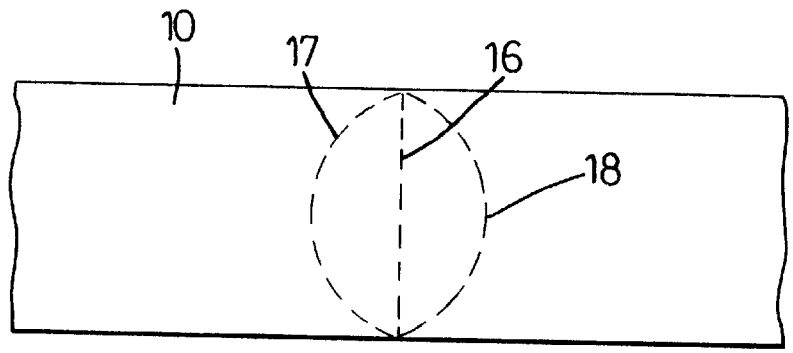
FIG. 2 shows part of a flattened tube marked with a fold line and two further lines showing the boundaries of contacting areas when the tube is inflated and bent.
Figure 3:
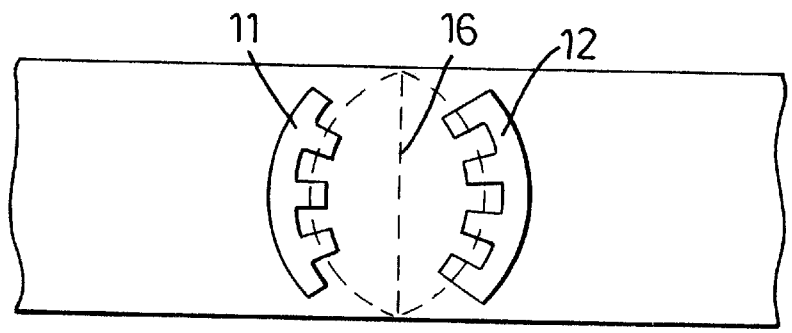
FIG. 3 shows the part of the flattened tube shown in FIG. 2 with the two elements shown in FIG. 1 attached thereto.

In accordance with the method of the first embodiment of the invention, in order to manufacture an inflatable tube 10 e.g. for a hexagonal liferaft and having six bends a panel cut from a sheet of polymer-coated fabric is marked to show the required position of the bend with a fold line 16 and two further lines 17 and 18 to show the positions of the joining elements. The panel is then formed into a tube, edges being joined together with a suitable joint such as an overlapping joint, using for example a welding technique or adhesive. The flattened tube 10 so formed (see FIG. 2) is then laid on a flat surface and the joining elements 11,12 are attached to by welding or adhesive as shown in FIG. 3. The positions of the further lines may be calculated as described in U.S. Pat. No. 4,472,225 to Bimpson and a template made and used in production.

A cord 15 is then passed loosely through the loops 13,14 in the two elements 11,12, one end is attached to the fabric of the tube 10 e.g. by welding, the cord pulled tight to cause the two elements to come together with the loops interengaged, and the other end of the cord secured e.g. to a cleat.

Figure 4:
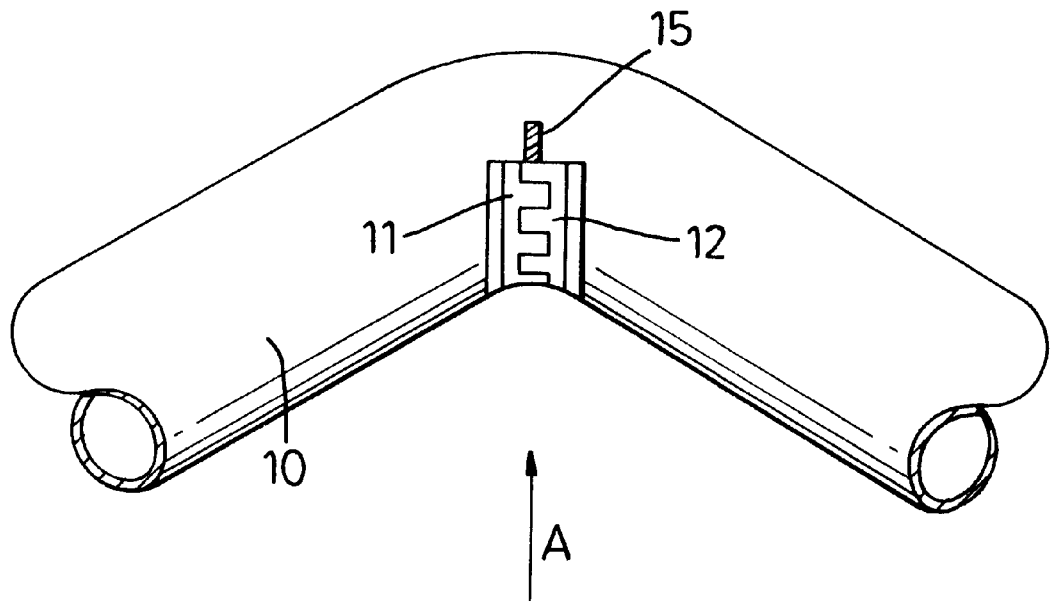
FIG. 4 shows a plan view of part of the flattened tube in an inflated and bent condition with the two elements joined together.
Figure 5:
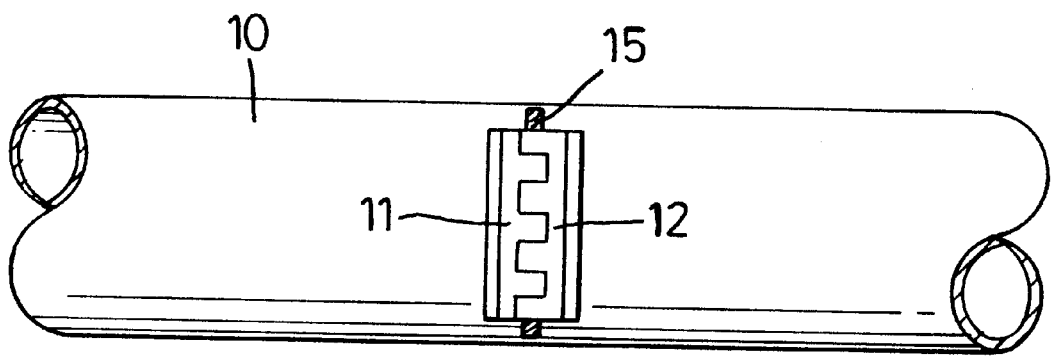
FIG. 5 shows a side elevation on arrow A of the part of the tube as shown in FIG. 4.

When all the required joining elements have been attached to the tube 10 and the other manufacturing stages of the liferaft completed, the liferaft is tested and packed. When deployed the tube 10 is inflated and the tube will take up the correct position with the bend as shown in FIGS. 4 and 5. However adjustment may be made and the elements 11,12 released by releasing the cord 15 from the loops 13,14.

The two joining elements 21,22 for the manufacture of a bent inflatable tube 20 according to the second embodiment comprise extruded flexible polymeric e.g. plastic, strip material. (The thickness of the material is exaggerated in FIG. 6).

One element 21 has a (female) groove formed along one edge 24, the groove having a narrow entrance portion 25 and an enlarged interior channel 26. Sharp edged elongated triangular cross-sectional ridges 27,28 are provided at the junction of the narrow entrance 25 and the enlarged channel 26.

The other element 22 has a (male) rib 29 extending along an edge 30 (which faces the edge 24 of the first element 21), the rib 29 having a narrow portion 31 and an enlarged portion 32 having the cross-sectional shape of an arrow head with barbs 35,36 one on each side of the rib. When the two elements 21,22 are joined the rib 29 is inserted into the narrow entrance passage 25. The material flexes to allow the enlarged portion 32 to enter the entrance portion 25, pushing the material on each side apart, and then enter the enlarged interior channel 26. When the barbed arrow head portion 32 completely passes the ridges 27,28 it is then pulled outwards slightly so the barbs 35,36 of the arrow head 32 engage behind the ridges 27,28 to prevent the two elements 21,22 from separating due to a force in the plane of the elements and perpendicular to the length of the rib 29 and groove 23. However if necessary the elements 21,22 may be separated by "peeling back" first the top part 40 of the left-hand element as shown n FIG. 6, and then the rib 29, the separating forces being applied generally transversely to the plane of the two elements 21,22.

Figure 6:
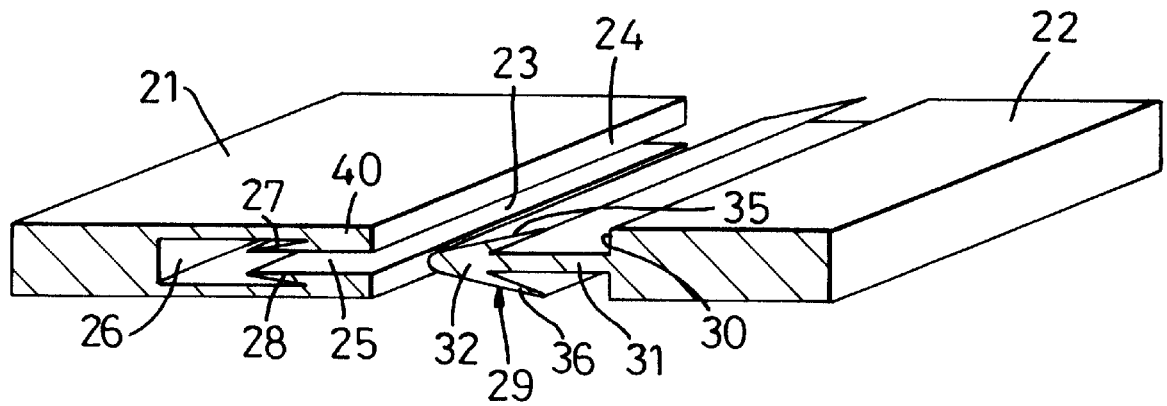
FIG. 6 shows a perspective view of two elements for holding an inflated tube in a bent position according to a second embodiment of the invention.
Figure 7:
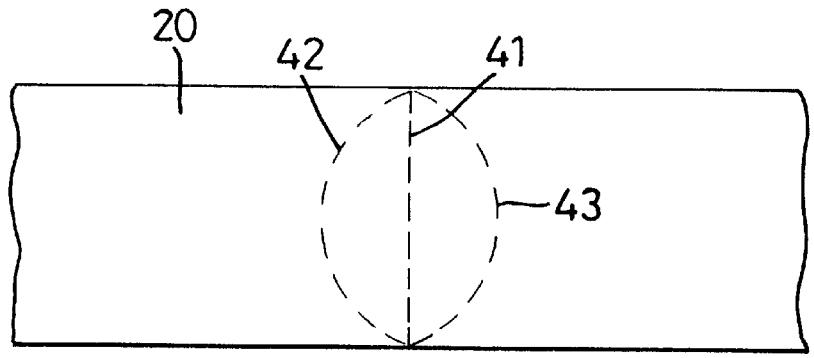
FIG. 7 shows a part of a flattened tube marked with a fold line and two further lines showing the boundaries of contacting areas when the tube is inflated and bent.
Figure 8:
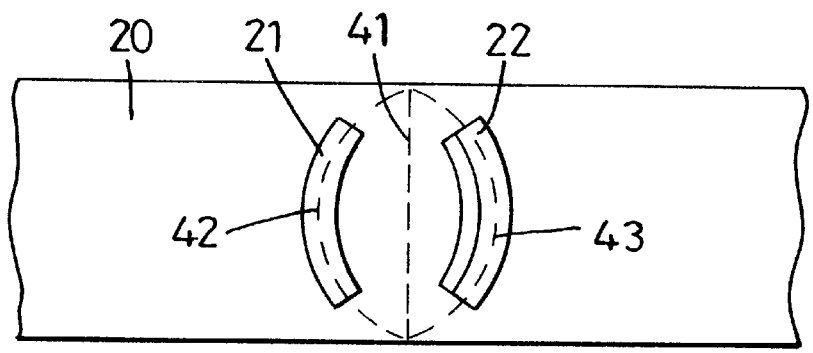
FIG. 8 shows the part of the flattened tube shown in FIG. 7 with the two elements shown in FIG. 6 attached thereto.

In the method of the second embodiment a sheet of fabric is marked and formed into flattened inflatable tube 20 in the same way as for the first embodiment. The tube has a fold line 41 and two further lines 42,43 as shown in FIG. 7. The two joining elements 21,22 shown in FIG. 6 are attached to the flattened tube by adhesive or welding as shown in FIG. 8 along the further lines 42,43 indicating the boundaries of the areas which will be in contact when the tube 20 is inflated and bent.

Figure 9:
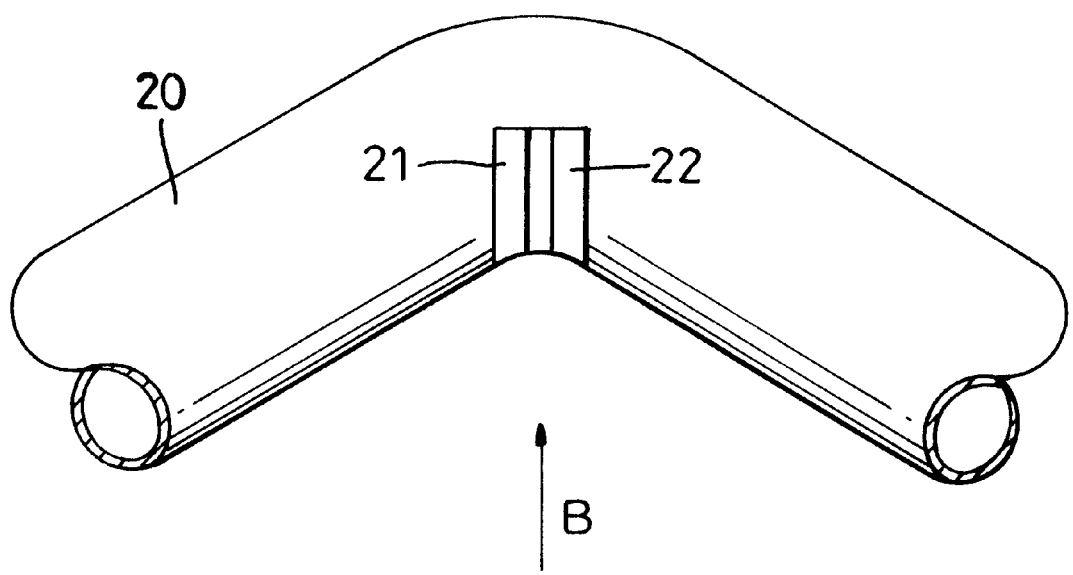
FIG. 9 shows a plan view of the part of the tube shown in FIG. 8 in an inflated and bent position, with the two elements joined together.
Figure 10:
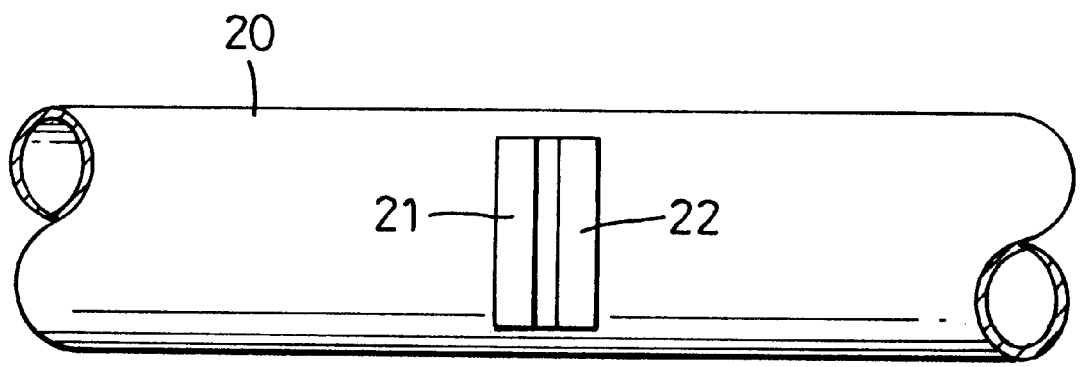
FIG. 10 shows a side elevation on arrow B of the part of the tube as shown in FIG. 9.

When all the joining elements required have been attached to the tube and the other manufacturing stages completed, the liferaft is tested and then the joining elements are joined together. When the liferaft is deployed the tube is inflated and the tube will take up the correct position with each bend as shown in FIGS. 9 and 10.

What I claim is:

1. A method of making a length of inflatable tube with a bend in it comprising: (a) joining the longitudinal edges of a sheet of suitable material to form a tube, (b) marking on one surface of the material before or after the tube has been formed two lines, one on each side of the desired position of the bend, said lines being the boundaries of surface areas which contact each other when the inflated tube is bent, (c) attaching along at least part of the length of each line two series of loops, forming the bend, the loops interdigitating with one another when the bend is made, (d) passing a tension member through the loops, and (e) securing the tension member to hold the tube in the bent condition.

2. The method according to claim 1 comprising attaching the two series of loops permanently to the material surface by welding.

3. The method according to claim 1 comprising permanently attaching the two series of loops to the material surface by means of adhesive.

4. The method according to claim 1 wherein the tension member is a cord.

5. A method of making a length of inflatable tube with a bend in it comprising: (a) joining the longitudinal edges of a sheet of suitable material to form a tube, (b) marking on one surface of the material before or after the tube has been formed two lines, one on each side of the desired position of the bend, said lines being the boundaries of surface areas which contact each other when the inflated tube is bent, (c) attaching along at least part of the length of each line the two parts of a zip fastener, (d) forming the bend, and (e) interdigitating the row of teeth from one part with the row of teeth from the other part to interconnect the two parts to hold the tube in the bent condition.

6. A method of making a length of inflatable tube with a bend in it comprising: (a) joining the longitudinal edges of a sheet of suitable material to form a tube, (b) marking on one surface of the material before or after the tube has been formed two lines, one on each side of the desired position of the bend, said lines being the boundaries of surface areas which contact each other when the inflated tube is bent, (c) attaching along at least part of the length of each line a male and female component, respectively, (d) forming the bend, and (e) fitting the male component inside the female component to hold the tube in the bent condition.

7. The method according to claim 6 wherein the male component comprises a projecting rib and the female component comprises a correspondingly shaped recessed groove.

* * * * *